United States Patent [19]

Swift et al.

[11] 4,222,896

[45] Sep. 16, 1980

[54] MAGNESIA-ALUMINA-ALUMINUM PHOSPHATE-ZEOLITE CATALYST

[75] Inventors: Harold E. Swift, Gibsonia; John J. Stanulonis, Pittsburgh; Elizabeth H. Reynolds, Verona, all of Pa.

[73] Assignee: Gulf Research & Development Company, Pittsburgh, Pa.

[21] Appl. No.: 57,658

[22] Filed: Jul. 16, 1979

Related U.S. Application Data

[63] Continuation-in-part of Ser. No. 958,628, Nov. 8, 1978, Pat. No. 4,179,358.

[51] Int. Cl.$^3$ ............................................. B01J 27/14
[52] U.S. Cl. .................................................. 252/437
[58] Field of Search ........................................ 252/437

[56] References Cited

U.S. PATENT DOCUMENTS

| | | | |
|---|---|---|---|
| 3,211,801 | 10/1965 | Holm et al. | 252/437 X |
| 3,342,750 | 9/1967 | Kearby | 252/437 |
| 3,962,134 | 6/1976 | Coff | 252/437 |
| 4,049,573 | 9/1977 | Koeding | 252/437 X |
| 4,080,311 | 3/1978 | Kehl | 252/437 |

*Primary Examiner*—Delbert E. Gantz
*Assistant Examiner*—William G. Wright

[57] ABSTRACT

A catalyst for cracking gasoline feedstock with superior selectivity to gasoline production and greater metals tolerance comprising a magnesia-alumina-aluminum phosphate matrix composited with a zeolite having cracking activity.

9 Claims, No Drawings

MAGNESIA-ALUMINA-ALUMINUM PHOSPHATE-ZEOLITE CATALYST

This application is a continuation-in-part application of our U.S. patent application Ser. No. 958,628, filed Nov. 8, 1978 now U.S. Pat. No. 4,179,358 for A FLUID CRACKING CATALYST PROCESS USING A ZEOLITE DISPERSED IN A MAGNESIA-ALUMINA-ALUMINUM PHOSPHATE MATRIX.

BACKGROUND OF THE INVENTION

1. Field of the Invention

The present invention resides in a catalyst comprising a zeolite dispersed in a magnesia-alumina-aluminum phosphate matrix suitable for use in a process for increasing gasoline yield and quality.

Around the turn of the century, motor vehicles in the United States began to appear in increasing numbers and gasoline obtained a degree of marketable value as a refinery product. Shortly thereafter, demand in the United States for motor fuels began to exceed the amount produced from refinery crude-oil runs geared for producing kerosene, fuel oils, etc., which were very much in demand at the time. Since then, the petroleum industry's most prominent problem has been inventing new and more efficient methods to meet the tremendous demand for gasoline without overproducing other petroleum products at the same time.

Due to the continually increasing demand for gasoline and the ever-shrinking supplies of crude cracking stocks, such as gas oils and the like, more attention has recently been direceted to the catalytic cracking of heavier charge stocks such as petroleum residuals. These charge stocks, however, suffer from the disadvantage of having high metals content which is concentrated therein during a normal cracking process. The metals tend to deposit on catalysts and decrease the cracking characteristics thereof in a cracking process. The novel catalysts defined and claimed herein are particularly formulated to increase the gasoline yield and quality (i.e., BTX) from gas oils during a cracking process and additionally to catalytically crack petroleum residuals with high selectivity to gasoline production as well as having improved metals tolerant characteristics. Examples of typical metals which can be present during the cracking process include the following: nickel, vanadium, copper, chromium and iron.

2. Description of the Prior Art

The use of zeolitic cracking catalyts has become of increased importance in petroleum cracking processes due to the higher activity characteristics of these catalysts (see "Recycle Rates Reflect FCC Advances," by J. A. Montgomery, Oil & Gas Journal, Dec. 11, 1972, pp 81–86).

Several processes have been proposed in the past wherein zeolite catalysts are utilized to crack crude oils and petroleum residual feedstocks.

For example, U.S. Pat. No. 3,617,528; entitled "Hydrotreating Process and Catalyst;" issued to Hillman on Nov. 2, 1971 discloses a hydrotreating process and a catalyst consisting of an alumina containing porous carrier material, a nickel component and a phosphorous component. The porous carrier is described as an adsorptive high surface area support. Suitable carrier materials include amorphous refractory inorganic oxides, for example, alumina, titania, zirconia, chromia, magnesia and the like.

U.S. Pat. No. 3,838,040, entitled "Hydrocracking with Zeolite in a Silica-Magnesia Matrix," issued to Ward on Sept. 24, 1974 relates to hydrocarbon conversion catalysts which are described as having increased activity and selectivity as well as improved physical characteristics. The catalysts consist of crystalline zeolitic aluminosilicates and silica-magnesia. It is to be noted that the prior art fails to appreciate a catalyst system comprising zeolite composited with a magnesia-alumina-aluminum phsophate matrix, as specifically defined herein, to increase gasoline production and quality in a hydrocarbon cracking process.

SUMMARY OF THE INVENTION

We have discovered a catalyst for increasing the gasoline yield and quality in a petroleum cracking reaction under catalytic cracking conditions comprising a magnesia-alumina-aluminum phosphate matrix characterized, after calcination at 500° C. for 10 hours, as amorphous having an average pore radius of from about 10 Å to about 200 Å, preferably from about 75 Å to about 150 Å; a surface area ranging from about 100 $M^2/g$ to about 350 $M^2/g$, preferably from about 125 $M^2/g$ to about 250 $M^2/g$; and a pore volume of from about 0.3 cc/g to about 1.5 cc/g, preferably from about 0.7 cc/g to about 1.2 cc/g and wherein the magnesia-alumina-aluminum phsophate matrix has a mole percent ratio of from about 10:80:10 to about 25:10:65, especially from about 10:60:30 to about 20:35:45; and wherein said matrix retains at least 90% of its surface area when the matrix is additionally calcined at a temperature up to about 750° C. for about 10 hours; said matrix being composited with from about 5 to about 50 weight percent, especially from about 5 to about 35 weight percent, of a zeolite having cracking activity, particularly a REY-zeolite.

DESCRIPTION OF THE INVENTION

This invention relates to an improved catalyst for increasing the gasoline yield and quality in a catalytic cracking process of either light or heavy feedstocks which can contain a high metals content. Particularly, the catalyst comprises a magnesia-alumina-aluminum phosphate matrix composited with a zeolite having cracking activity.

The matrix with which the zeolite is composited is preferably a magnesia-alumina-aluminum phosphate of the general formula:

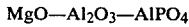

$$MgO—Al_2O_3—AlPO_4$$

Normally, the magnesia-alumina-aluminum phosphate constituents are in a mole percent ratio range of from about 10:80:10 to about 25:10:65, preferably from about 10:60:30 to about 20:35:45. The above magnesia-alumina-aluminum phosphate matrix can be prepared according to techniques and methods normally used in the art. One such method is set forth in copending U.S. patent application Ser. No. 958,804, filed Nov. 8, 1978 to Kehl et al, the disclosure of which is incorporated herein by reference.

It is to be noted that the magnesia-alumina-aluminum phosphate matrix herein is characterized after calcination at 500° C. for 10 hours, as amorphous having an average pore radius of from about 10 Å to about 200 Å, preferably from about 75 Å to about 150 Å; a surface area ranging from about 100 $M^2/g$ to about 350 $M^2/g$, preferably from about 125 $M^2/g$ to about 250 $M^2/g$; and a pore volume of from about 0.3 cc/g to about 1.5 cc/g, preferably from about 0.7 cc/g to about 1.2 L cc/g; and wherein said matrix retains at least 90 percent of its surface area when the matrix is additionally calcined at a temperature up to about 750° C. for about ten hours.

Typical zeolites or molecular sieves having cracking activity and which can be suitably dispersed in a matrix for use as a cracking catalyst are well known in the art. The zeolites are crystalline aluminosilicates, both natural and synthetic, which possess three-dimensional structures containing a large number of uniform openings or cavities, interconnected by smaller, relatively uniform holes or channels. The effective pore size is suitably between 4 Å and 15 Å in diameter. In their hydrated form, they may be represented by the formula $$Xm_{2/n}O:Al_2O_3:YSiO_2:ZH_2O$$

wherein M represents at least one metal cation of valence n, X represents the moles of metal cation, Y the moles of $SiO_2$ and Z the moles of $H_2O$. The cation can be any one or more of a number of metal ions depending upon whether the zeolite is synthetic or naturally-occurring. The naturally-occurring molecular sieve zeolites are usually found in the sodium form, an alkaline earth metal form, or mixed forms. The synthetic molecular sieves are normally in their sodium form; however, it should be understood that other alkali metal compounds can be substituted therefor.

Zeolites which can be employed in accordance with this invention include gmelinite, chabazite, dachiardiate, clinoptilolite, faujasite, heulandite, analcite, levynite, erionite, sodalite, cancrinite, napheline, lazurite, scolecite, natrolite, offretite, mesolite, mordenite, brewsterite, ferrierite, and the like. The faumasites are preferred. Suitable synthetic zeolites which can be treated in accordance with this invention include zeolites X, Y, A, L, ZK-4, B, E, F, HJ, M, Q, T, W, Z, alpha and beta, ZSM-types and omega. The term "zeolites" as used herein contemplates not only aluminosilicates but substances in which the aluminum is replaced by gallium and substances in which the solicon is replaced by germanium. The preferred zeolites for this invention are the synthetic faujasites of the types Y and X or mixtures thereof; however, the Y-type zeolites are superior when used herein.

The crystalline aluminosilicate zeolites, such as synthetic faujasite, will under normal conditions, crystalize as regularly shaped, discrete particles of approximately one to ten microns in size, and, accordingly, this is the size range normally used in commercial catalysts. Preferably the particle size of the zeolites is from 0.5 to 10 microns and more preferably is from 1 to 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area. Therefore, to minimize the effect of contamination and pore blockage, crystals larger than the normal size cited above are preferably not used in the catalysts of this invention.

It is also well known in the art that to obtain good cracking activity the zeolites have to be in a proper form. In most cases this involves reducing the alkali metal content of the zeolite to as low a level as possible. Further, a high alkali metal content reduces the thermal structural stability and the effective lifetime of the catalyst will be impaired as a consequence thereof. Procedures for removing alkali metals and putting the zeolite in the proper form are well known in the art as described, for example, in U.S. Pat. No. 3,537,816. These procedures for activating and stabilizing the zeolite generally consist of the substitution of various cations for the alkali metal cations by an exchange procedure. For the cracking operations described herein, preferable cations are hydrogen, ammonium, rare earth and mixtures thereof, with particular preference being accorded rare earth.

The term REY-zeolites as defined herein is the Y-type zeolite that has undergone an ion exchange reaction with rare earth metal ions. A wide variety of rare earth compounds can be ion exchanged but chlorides, nitrates and sulfates are preferred. The rare earth metal salts employed can either be the salt of a single rare earth metal or mixtures of rare earth metals selected from the group consisting essentially of lanthanum, cerium, neodymium and praseodymium with minor amounts of samarium, gadolinium and yttrium. The specific mixture referred to in the examples herein contain the chlorides of the rare earth mixture having the relative composition cerium (as $CeO_2$) 48 percent by weight, lanthanum (as $La_2O_3$) 24 percent by weight, praseodymium (as $Pr_6O_{11}$) five percent by weight, neodymium (as $Nd_2O_3$) 17 percent by weight, samarium (as $Sm_2O_3$) three percent by weight, gadolinium (as $Gd_2O_3$) two percent by weight, and other rare earth oxides 0.8 percent by weight.

The zeolite is composited with the magnesia-alumina-aluminum phosphate matrix from about five to about 50 weight percent, preferably from about five to about 35 weight percent, based on the weight of said matrix. The method of forming the final composited catalyst does not form a part of this invention, and any method well known to those skilled in the art is acceptable. For example, finely divided zeolite can be admixed with finely divided magnesia-alumina-aluminum phosphate and the mixture spray dried using conventional methods to form the final catalyst.

Typical feedstocks that can be treated with the novel catalyst herein include light or heavy gas oils, light fractions of crude oil, heavy fractions of crude oil, or the like. Any type reaction vessel can be used which is normally used in the art. For example, U.S. Pat. No. 3,944,482 to Mitchell et al sets forth a suitable reaction vessel, reaction conditions, and process therefor, the teachings of which are incorporated herein by reference.

The weight ratio of catalyst to hydrocarbon feedstock is from about 4:1 to about 12:1, preferably from about 6:1 to about 10:1. The fresh hydrocarbon feedstock is generally preheated to a temperature of from about 316° C. to about 371° C., but is held below the vaporization point of said hydrocarbon feedstock. Additional heat required to achieve the desired reactor temperature is imparted to the reaction mixture by hot, regenerated catalyst.

The reactor linear velocity should not be sufficiently high to induce turbulence or excessive backmixing; however, the reactor linear velocity must be sufficiently high so that substantially no catalyst accumulation or build up occurs in the reactor because such accumulation leads to backmixing.

Avoiding a catalyst build up in the reactor results in a very low catalyst inventory in the reactor, which results in a high space velocity. It is to be noted that conditions such as reactor size, etc., will determine the space velocity of the process. However, the space velocity herein is from about 35 to about 500 weight of hydrocarbon feedstock per hour per weight of catalyst, especially from about 50 to about 300 weight of hydrocarbon feedstock per hour per weight of catalyst. It is to be noted that the above conditions and description of operation are for a preferred fluid bed riser cracking operation.

The zeolite riser cracking conditions and system (known as FCC or fluid catalytic cracking) suitable for use herein are described in greater detail in U.S. Pat. No. 3,617,512, the disclosure of which is incorporated herein by reference. However, the older conventional fluid bed operation or a fixed-bed operation can also be used.

We have discovered that a magnesia-alumina-aluminum phosphate matrix, as described and defined herein, has a low intrinsic cracking activity, interacts synergistically with a zeolite, particularly a REY-zeolite, as herein described and defined, to produce a cracking catalyst of high activity giving superior selectivity for gasoline production and quality.

The hydrocarbon feedstock used herein was a Kuwait gas oil having a boiling range of from about 260° C. to about 426° C. Inspections of this Kuwait gas oil are shown in Table I below.

Table I

| KUWAIT GAS OIL INSPECTIONS | |
| --- | --- |
| Stock Identification | MAT Feedstocks |
| Inspections: | |
| Gravity, API, D-287 | 23.5 |
| Viscosity, SUS D2161, 130° F. | 94.7 |
| Viscosity, SUS D2161, 150° F. | 70.5 |
| Viscosity, SUS D2161, 210° F. | 50.8 |
| Pour Point, D97, °F. | +80 |
| Nitrogen, wt % | 0.074 |
| Sulfur, wt % | 2.76 |
| Carbon, Res., D524, wt % | 0.23 |
| Bromine No., D1159 | 5.71 |
| Aniline Point, °F. | 176.5 |
| Nickel, ppm | <0.1 |
| Vanadium, ppm | <0.1 |
| Distillation, D1160 at 760 mm | |
| End Point, °C. | 426 |
| 5 Pct. Cond. | 263 |
| Approx. Hydrocarbon Type Analysis: Vol % | |
| Carbon as Aromatics | 23.1 |
| Carbon as Naphthenes | 10.5 |
| Carbon as Paraffins | 66.3 |

DESCRIPTION OF THE PREFERRED EMBODIMENTS

EXAMPLE I

A magnesia-alumina-aluminum phosphate matrix was prepared according to the following procedure:

A first solution was prepared by dissolving 96 grams of magnesium nitrate in 2 liters of water. A second solution was prepared by dissolving 1266 grams of aluminum nitrate in 4 L liters of water. The two solutions must be clear. Next, the two solutions were combined and 90 grams of 85% phosphoric acid were added and the resulting mixture was agitated for about 5 minutes to form a final solution.

Approximately 3 liters of water were placed in a mixing vessel to provide a mixing medium. The above-described final solution was slowly added in combination with an aqueous solution of ammonium hydroxide (ratio = 1:1) at relative rates to maintain the mixing medium pH at 9.0. The mixing medium was vigorously agitated during the addition period and continued for an additional 10 minutes thereafter to insure maximum contact of the mixing medium components. The mixture was then filtered, the precipitate was washed with 15 liters of water and dried.

The above-described magnesia-alumina-aluminum phosphate matrix, after calcination for 10 hours at 500° C., is characterized by a surface area of 208 $M^2/g$, an average pore radius of 106° A and a pore volume of 1.11 $cm^3/g$. It is to be noted that the large pore radius of the above matrix is highly beneficial for enhancing metals tolerance in the completed catalyst. The above matrix can be slurried with a zeolite having cracking activity, for example, a REY-zeolite, as defined herein, to produce the desired catalyst.

EXAMPLE II

A representation REY-zeolite was prepared according to the following procedure:

Into a 4-liter, 3-necked flask equipped with a mechanical stirrer, a water-cooled condenser and thermometer were added 2400 ml. of water heated to 80° C., with stirring. To the water was added 800 grams of sodium Y zeolite and 564 grams rare earth chloride mixture comprising 48% cerium, 24% lanthanum, 5% praseodymium, 17% neodymium, 3% samarium, 2% gadolinium and 0.8% other rare earth compounds. It is to be noted that all percents are by weight. The temperature was maintained at 80° C. for two hours with continued stirring and the reaction mixture was then filtered. The filtered REY-zeolite was reslurried with 2400 ml. of water and heated to a temperature of 80° C. Next, an additional 564 grams of the above rare earth chloride mixture was added to the solution. The temperature was maintained at 80° C. for two hours with stirring. The resulting REY-zeolite was filtered and washed with eight 1-liter batches of water.

The REY-zeolite was calcined at 538° C. for 10 hours, slurried with 2400 ml. of water and heated to 80° C. The procedure set forth above for the addition of the rare earth chloride mixture to the Y-type zeolite was repeated two additional times and the final reaction product was filtered and washed with eight 1-liter batches of water.

Next, the finished matrix-zeolite catalyst was prepared by slurring the matrix of Example I with a portion of the REY-zeolite produced above. The slurry was then spray dried and calcined for 10 hours at 500° C.

EXAMPLES III TO VII

In Examples III to VII, a comparison was made of the following: silica-alumina, silica-alumina combined with 15 percent REY-zeolite prepared in Example II, the magnesia-alumina-aluminum phosphate prepared in Example I, the magnesia-alumina-aluminum phosphate matrix prepared in Example I combined with 15 percent REY-zeolite prepared in Example II and Filtrol 75 F. The silica-alumina used in Examples III and IV was composed of 75 weight percent silica and 25 weight percent alumina and the molar ratio of the magnesia-alumina-aluminum phosphate in Examples V and VI was 14:55:31. These materials were evaluated using a microactivity test (MAT) unit similar to the Standard Davison MAT (see Ciapetta, F. C. and Handerson, D.

S. "Oil and Gas Journal," 65,88, 1967). Catalyst samples were tested at 482° C., 15 weight hourly space velocity; 80 seconds catalyst contact time and a catalyst to oil ratio of 2.9. The charge stock was a Kuwait gas oil having a boiling range of from about 260° C. to about 426° C. (see Table I for inspection). The results are set forth in Table II below.

Table II

| | MICROACTIVITY TEST DATA | | | | |
|---|---|---|---|---|---|
| Example | III | IV | V | VI | VII |
| Catalyst | Silica-Alumina | Silica-Alumina +15% REY-Zeolite | Magnesia-Alumina-Aluminum Phosphate of Ex. I | Magnesia-Alumina-Aluminum Phosphate +15% REY-Zeolite of Ex. II | Filtrol 75F[1] |
| Conversion Vol % ff[2] | 48.9 | 82.7 | 16.8 | 80.2 | 70.6 |
| $C_5$ + gasoline Vol % ff | 29.3 | 54.4 | 10.1 | 54.5 | 47.7 |
| % selectivity to gasoline | 59.9 | 65.8 | 60.1 | 68.0 | 67.6 |
| BTX content[3] wt % ff | — | 5.9 | 0.6 | 6.3 | 5.5 |
| % selectivity to BTX | — | 7.1 | 3.6 | 7.9 | 7.8 |
| Carbon, wt % ff | 2.5 | 5.0 | 3.6 | 4.2 | 3.5 |
| Hydrogen, wt % ff | 0.05 | 0.05 | 3.6 | 0.04 | 0.03 |

[1]Filtrol 75F = A catalyst marketed commercially by the Filtrol Corporation, located in Los Angeles, Ca., which is believed to contain 15 wt % zeolite
[2]ff = Fresh feed
[3]BTX content = Benzene, toluene and xylenes content It is to be noted that the matrix material of this invention has a low intrinsic cracking activity but when composited with the REY-zeolites herein, interacts synergistically to produce a cracking catalyst of high activity which results in superior production of high quality gasoline.

EXAMPLES VIII TO XI

In Examples VIII to XI the catalysts used in Examples VI and VII were examined using the above-described MAT unit test to determine the selectivity of BTX as a function of temperature. The reactor temperature was varied in accordance with the temperatures of Table III below, with the other parameters remaining the same. The results are set forth in Table III.

Table III

| | BTX SELECTIVITY AS A FUNCTION OF TEMPERATURE | | | |
|---|---|---|---|---|
| EXAMPLE | VIII | IX | X | XI |
| Catalyst | Magnesia-Alumina Aluminum Phosphate +15% REY-Zeolite Used In Ex. VI | Magnesia-Alumina-Aluminum Phosphate +15% REY-Zeolite Used In Ex. VI | Filtrol 75F[1] Used In Ex. VII | Filtrol 75F[1] Used In Ex. VII |
| Temperature, °C. | 900 | 1000 | 900 | 1000 |
| Conversion, Vol ff[2] | 80.2 | 84.7 | 70.6 | 75.3 |
| BTX content, Wt % ff[3] | 6.3 | 9.7 | 5.5 | 7.4 |
| Percent Selectivity to BTX | 7.9 | 11.5 | 7.8 | 9.8 |

[1]Filtrol 75F = A catalyst marketed commercially by the Filtrol Corporation located in Los Angeles, CA, which is believed to contain 15 wt % zeolite
[2]ff = fresh feed
[3]BTX = Benzene, toluene and xylenes content The above data indicate that the catalyst herein displays a marked increase in aromatics production with a modest increase in reaction temperature. This enhanced performance in combination with the catalyst thermal stability properties will permit production of gasoline having a higher octane number through the use of higher temperature processing conditions.

EXAMPLES XII TO XVI

The catalyst used in Example VI was examined for metals tolerance by synthetically contaminating said cracking catalyst with several concentration levels of nickel and vanadium. The series was prepared by impregnating the catalyst with nickel and vanadium naphthates to metals levels of 1200, 1900, 3000 and 5000 parts per million (PPM) nickel equivalents. Parts per million nickel equivalents means the total PPM of nickel plus one-fifth of the total PPM of vanadium by weight deposited on the catalyst. The test procedure of Examples III to VII was followed with the following results:

Table IV

| | CATALYST METALS TOLERANCE - MAT[1] DATA | | | | |
|---|---|---|---|---|---|
| EXAMPLE | XII | XIII | XIV | XV | XVI |
| Catalyst Description | CAT.[4] Used In Ex.VI | CAT. Used In Ex.VI | CAT. Used In Ex.VI | CAT. Used In Ex.VI | CAT. Used In Ex.VI |
| Temperature °C. | 482 | 482 | 482 | 482 | 482 |
| Metals Concentration,PPM[2] | 0 | 1200 | 1900 | 3000 | 5000 |
| Conversion, Vol % ff[3] | 80.2 | 71.0 | 67.5 | 62.0 | 54.0 |

Table IV-continued

| CATALYST METALS TOLERANCE - MAT[1] DATA | | | | | |
|---|---|---|---|---|---|
| EXAMPLE | XII | XIII | XIV | XV | XVI |
| | CAT.[4] | CAT. | CAT. | CAT. | CAT. |
| | Used In | Used In | Used In | Used In | Used In |
| Catalyst Description | Ex.VI | Ex.VI | Ex.VI | Ex.VI | Ex.VI |
| $C_5$ + Gasoline, Vol % ff | 54.5 | 45.5 | 42.0 | 37.5 | 30.0 |
| Carbon, Wt % ff | 4.2 | 5.8 | 6.2 | 6.6 | 6.8 |
| Hydrogen, Wt % ff | 0.04 | 0.39 | 0.54 | 0.72 | 0.87 |

[1]MAT = Micro Activity Test Unit
[2]Expressed as nickel equivalents [Total PPM of nickel plus one-fifth of the total PPM of vanadium by weight]
[3]ff = Fresh feed basis for calculations
[4]Cat. = Catalyst

EXAMPLES XVII TO XXI

The catalyst used in Example VII was examined for comparison purposes in accordance with the procedure set forth in Examples XII to XVI. The results are tabulated in Table V below.

Table V

| CATALYST METALS TOLERANCE - MAT[1] DATA | | | | | |
|---|---|---|---|---|---|
| EXAMPLE | XVII | XVIII | XIX | XX | XXI |
| | CAT.[4] | CAT. | CAT. | CAT. | CAT. |
| | Used In | Used In | Used In | Used In | Used In |
| Catalyst Description | Ex.VII | Ex.VII | Ex.VII | Ex.VII | Ex.VII |
| Temperature, °C. | 482 | 482 | 482 | 482 | 482 |
| Metals Concentration, PPM[2] | 0 | 1200 | 1900 | 3000 | 5000 |
| Conversion, Vol % ff[3] | 70.6 | 61.7 | 57.9 | 53.5 | 49.6 |
| $C_5$ + gasoline, Vol % ff | 47.7 | 40.8 | 38.0 | 33.5 | 25.5 |
| Carbon, Wt % ff | 3.5 | 4.9 | 5.5 | 6.0 | 6.2 |
| Hydrogen, Wt % ff | 0.03 | 0.27 | 0.44 | 0.57 | 0.68 |

[1]MAT = Micro Activity Test Unit
[2]Expressed as nickel equivalents [Total PPM of nickel plus one-fifth of the total PPM of vanadium by weight]
[3]ff = Fresh feed basis for calculations
[4]Cat. = Catalyst As can readily be seen from the above data the catalyst compositions of this invention are superior in its cracking activity; selective to gasoline yield and, additionally, exhibits excellent metals tolerance, attrition and thermal stability properties.

We have additionally found that when the novel catalyst defined and claimed herein is subjected to regeneration after use no appreciable amount of sulfur dioxide will be present in the regenerator flue gases, that is, the gaseous combustion products containing CO and/or $CO_2$ generally obtained as a result of the oxidative regeneration of the catalyst by combustion in air or oxygen to remove coke or carbon therefrom. Therefore, the sulfur on the catalyst is non-oxidizable to any appreciable extent under conditions wherein coke or carbon is ordinarily removed by combustion. This is illustrated below in Example XXII.

EXAMPLE XXII

Several runs were carried out wherein Kuwait gas oil (see Table I for inspection) was passed through a quartz preheat zone and then downwardly through five-gram samples of 10-20 mesh catalyst over a five-minute period at a weight hourly space velocity of 4.4 while maintaining the catalyst at a temperature of 482° C. The following catalysts were used in the individual runs: Filtrol 75 F, Filtrol 75 F composited with one weight percent magnesium, magnesia-alumina-aluminum phosphate (0.25 $MgO.Al_2O_3.0.56$ $AlPO_4$) composited with 15 weight percent REY-zeolite and alumina-aluminum phosphate-silica ($Al_2O_3.2$ $AlPO_4.0.64$ $SiO_2$) composited with 15 weight percent REY-zeolite. At the end of each run the catalyst was stripped with nitrogen for 15 minutes and then cooled and discharged. Half of each coked sample was returned to the reactor and regenerated in an upflow configuration in air for one hour at 649° C. The data obtained are tabulated below in Table VI.

TABLE VI

| | | SULFUR CONTENT OF CATALYSTS | | | | |
|---|---|---|---|---|---|---|
| Run No. | Catalyst | Wt. % S In Fresh Catalyst | Wt. % S In Coked Catalyst | Wt. % S Increase In Reaction | Wt. % S In Regenerated Catalyst | Wt. % S Decrease During Regeneration |
| 1 | Filtrol 75 F | 0.16 | 0.26 | 0.10 | 0.16 | 0.10 |
| 2 | Filtrol 75 F + 1% Mg | 0.19 | 0.27 | 0.08 | 0.21 | 0.06 |
| 3 | 0.25 MgO . $Al_2O_3$ . 0.56$AlPO_4$ + 15% REY-Zeolite | 0.05 | 0.09 | 0.04 | 0.09 | 0 |
| 4 | $Al_2O_3$ . 2$AlPO_4$ . 0.64 $SiO_2$ + 15% REY-Zeolite | 0.07 | 0.18 | 0.11 | 0.09 | 0.09 |

The results obtained above using the novel catalyst defined and claimed herein are remarkable. When the novel catalyst of this invention was employed it picked up far less sulfur from the oil being treated than the remaining catalysts. More importantly, during regeneration the novel catalyst herein refused to give up any of its sulfur. Since this is so none of the sulfur was converted to sulfur dioxide for release to the atmosphere with the flue gases.

Obviously, many modifications and variations of the invention, as hereinabove set forth, can be made without departing from the spirit and scope thereof, and therefore only such limitations should be imposed as are indicated in the appended claims.

We claim:

1. A catalyst for increasing the gasoline yield and quality in a petroleum cracking reaction under catalytic cracking conditions comprising a magnesia-alumina-aluminum phosphate matrix characterized, after calcination at 500° C. for 10 hours, as amorphous, having an average pore radius of from about 10 Å to about 200 Å; a surface area ranging from about 100 $M^2/g$ to about 350 $M^2/g$; a pore volume of from about 0.3 cc/g to about 1.5 cc/g; and wherein the magnesia-alumina-aluminum phosphate matrix has a mole percent ratio of from about 10:80:10 to about 25:10:65, and wherein said matrix retains at least 90% of its surface area when the matrix is additionally calcined at a temperature up to about 750° C. for about 10 hours; said matrix being composited with from about 5 to about 50 weight percent of a zeolite having cracking activities.

2. The composition according to claim 1 wherein the magnesia-alumina-aluminum phosphate matrix has an average pore radius of from about 75 Å to about 150 Å.

3. The composition of claim 1 wherein the magnesia-alumina-aluminum phosphate matrix has a surface area of from about 125 $M^2/g$ to about 250 $M^2/g$.

4. The composition according to claim 1 wherein the magnesia-alumina-aluminum phosphate matrix has a pore volume of from about 0.7 cc/g to about 1.2 cc/g.

5. The composition of claim 1 wherein the magnesia-alumina-aluminum phosphate matrix has a mole percent ratio range of from about 10:60:30 to about 20:35:45.

6. The composition of claim 1 wherein said zeolite is a REY-zeolite.

7. The composition according to claim 6 wherein from about 5 to about 35 weight percent REY-zeolite is composited with the magnesia-alumina-aluminum phosphate matrix.

8. The composition of claim 6 wherein the REY-zeolite contains a rare earth metal selected from the group consisting of cerium, lanthanum, praseodynium, neodymium, illinium, samarium, europium, gadolinium, terbium, dysprosium, holmium, erbium, thulium, scandium, yttrium, lutecium and mixtures thereof.

9. The composition according to claim 6 wherein the REY-zeolite is a type Y synthetic faujasite.

* * * * *

UNITED STATES PATENT OFFICE
CERTIFICATE OF CORRECTION

Patent No. 4,222,896           Dated September 16, 1980

Inventor(s) H. E. Swift, J. J. Stanulonis and E. H. Reynolds

It is certified that error appears in the above-identified patent and that said Letters Patent are hereby corrected as shown below:

COL. 3, line 2, --1.2 L cc/g;-- should read
        --1.2 cc/g;--

COL. 5, line 60 --4 L liters-- should read
        --4 liters--

COL. 9, Table V, --Hydrogen, Wt % ff 0.03-- should read
        --Hydrogen, Wt % ff Table V, Example XVII, --0.27-- should read--0.03--

Table V, Example XVIII, --0.44-- should read --0.27--

Table V, Example XIX, --0.57-- should read --0.44--

Table V, Example XX, --0.68-- should read --0.57--

Table V, Example XXI, should read --0.68--.

Signed and Sealed this

Twenty-fourth Day of March 1981

[SEAL]

Attest:

RENE D. TEGTMEYER

Attesting Officer     Acting Commissioner of Patents and Trademarks